United States Patent [19]

Arp et al.

[11] 4,402,740

[45] Sep. 6, 1983

[54] DUAL FUEL BURNER FOR METAL MELTING FURNACES

[75] Inventors: David F. Arp, Carroll, Ga.; Ronald L. Pariani, Escambia, Fla.

[73] Assignee: Southwire Company, Carrollton, Ga.

[21] Appl. No.: 324,171

[22] Filed: Nov. 23, 1981

Related U.S. Application Data

[62] Division of Ser. No. 173,790, Jul. 30, 1980, Pat. No. 4,326,700.

[51] Int. Cl.³ .................................... C22B 15/00
[52] U.S. Cl. ................................ 75/65 R; 75/72; 266/900
[58] Field of Search ............... 75/65, 43, 44 R, 44 S, 75/72; 266/900

[56] References Cited

U.S. PATENT DOCUMENTS 3,547,624 12/1970 Gray .................................. 75/43
4,326,700 4/1982 Arp et al. ....................... 266/219

Primary Examiner—M. J. Andrews
Attorney, Agent, or Firm—Herbert M. Hanegan; Stanley L. Tate; R. Steven Linne

[57] ABSTRACT

Disclosed is an improved high velocity dual fuel burner and a method for firing a vertical shaft metal melting furnace with gaseous or liquid fuel in which the burner nozzle is adapted to mix and ignite both types of fuels alternately or in combination by means of three concentric nozzles including a central oil spraying nozzle, an intermediate nozzle to supply natural gas and an outermost nozzle to supply combustion air.

2 Claims, 3 Drawing Figures

DUAL FUEL BURNER FOR METAL MELTING FURNACES

This application is a division of application Ser. No. 173,790, filed July 30, 1980 now U.S. Pat. No. 4,326,700.

BACKGROUND OF THE INVENTION

1. Field of the Invention

The present invention relates generally to burners for the combustion of fuel, and specifically to an improved high velocity dual fuel burner for optionally combusting gas or liquid fuel to fire a vertical shaft furnace for the continuous melting of metal pieces such as scrap copper.

2. Description of the Prior Art

In the prior art, there are many types of vertical furnace arrangements that have been used for melting various types of charge materials under a wide variety of different circumstances, such as the typical units disclosed in U.S. Pat. Nos. 2,203,163; 2,815,278; 2,886,304; 3,148,973; 3,199,977; 3,603,571; and, 3,958,919. U.S. Pat. Nos. 3,715,203; 3,788,623; and, 3,809,378 generally disclose specific types of furnace arrangements that are particularly useful in melting non-ferrous metals.

Modern industrial heating processes and especially metal melting furnaces require burners which have a number of preferred characteristics. Burners may generally be classified into three types, depending on the method of mixing the fuel and air.

The simplest arrangement, often called a throat-mix burner, consists of admitting the fuel and air into the combustion chamber through separate ports, usually adjacent to each other, and allowing the two to mix and burn in the furnace. This method of burning gives large, relatively slow-moving flames and has been widely used in firing open hearth steel furnaces.

A second type of mixing is found in the inspirator type of burner wheren the fuel is delivered to the burner under pressure and is discharged from a nozzle or jet in such a way that its momentum is used in mixing the fuel with indrawn air.

The third type of burner involves premixing all or part of the air with a gaseous fuel prior to delivery to the burner. With this arrangement the burner itself may be a relatively simple nozzle designed to deliver the combustible mixture without backfire or flame blowoff. A variety of arrangements are used for premixing and are well known in the art.

Within the prior art directed towards burners and their specific structural configurations, many varying types of burners have been designed to operate under a wide variety of particular applications and environments or for use in heating a material charge having various individual characteristics. Such burners include those as disclosed in U.S. Pat. Nos. 2,605,180; 3,701,517; 3,852,021; and 4,154,571.

Due to recent price increases and the widespread nonavailability of the cleaner gaseous fuels such as natural gas or propane or the like, it has become desirable to be able to burn various grades of fuel oils with such burners to provide the appropriate heating necessary for heating and melting a material charge within a furnace. Many attempts have been made at providing an effective liquid fuel burner such as those disclosed in U.S. Pat. Nos. 2,632,501; 2,697,910; 2,698,050; 2,711,214; 3,366,469; 2,205,983; 2,333,531; 2,632,300; 2,725,929; 3,042,105; 3,558,119; 3,749,548; 3,758,263; 3,777,983; 3,947,226; 3,980,415; 3,986,815; and, 4,025,282 and in U.S. Pat. application Ser. No. 921,039.

There are economic and logistic advantages and disadvantages in using either gas or liquid fuel systems. Natural gas fuel is normally less expensive than liquid fuel, but is available in sufficient supply, of at all, only seasonally. Gas fuel is also difficult to store at the site unless stored in liquid form such as liquified propane or butane or the like. Liquid fuel is usually more expensive but is also more available than gas fuel and easy to store as a reserve fuel supply. For these reasons, ability to optionally use gas and or liquid fuel would be highly advantageous, particularly in continuous industrial operations. This use of alternate fuels is possible under the prior art only by duplication of the separate types of burner systems including burners, manifolds and controls. However, duplication is expensive, inefficient and usually reduces the accurancy or ease of combustion control. The present invention provides the ability to optionally use gas and/or liquid fuel without system duplication by means of a novel burner design.

SUMMARY OF THE INVENTION

The present invention is an improved high velocity dual fuel burner and a method for firing a vertical shaft melting furnace with gas or liquid fuels in which the burner nozzle is adapted to efficiently mix and ignite both types of fuels alternately or in combination.

The method aspects of the present invention are manifested in a process for melting metal in a furnace which can be fired with any type of fuel such as natural gas, propane, butane, naptha, gasoline, fuel oil or the like. When liquid fuel is to be used, it is directed to the desired ignition point, such as a combustion chamber in the wall of a furnace, where it is vaporized and ignited by a pilot flame to fire the furnace, while an independent air supply means provides the large volume of oxygen containing air required for combustion. To convert from liquid fuel to gas fuel during continuous operation without interrupting the melting process, the amount of liquid fuel supplied to the ignition point is decreased as an increasing amount of gas fuel is premixed with the combustion air and supplied to the burner by the independant air supply means.

A continuous pilot flame is preferably supplied by combusting an air and gas mixture which is then used to continuously ignite the selected primary fuel. During partial converted mode both gaseous and liquid fuels may be used to fire the furnace, and when conversion is completed the system burns only gaseous fuel. To return to use of liquid fuel the process is simply reversed, all without interruption of the melting process.

The burners are preferably baked in sets of 3 to 6 which are supplied from common fuel and air regulation devices to reduce the complexity of the system and to promote more balanced firing whenever a large number of burners are used in a furnace.

Premix gas operation allows for a very accurate and reliable method of fuel ratio analysis and control not possible with a nozzle mix type of gas burner. The prefered method involves drawing off a sample of the premixed fuel gases prior to combustion, burning the gas remotely under controlled conditions, then analyzing the products of the controlled combustion to determine the percentage of carbon monoxide which is directly related to the composition of the fuel gas.

In addition, this invention is quieter than conventional nozzle mix burners resulting in significant reduction in the noise usually associated with vertical shaft melting furnaces.

Thus a major object of this invention is to provide a high velocity dual fuel burner for firing a vertical shaft melting furnace with gas or liquid fuels alterately or in combination.

Another object of this invention is to provide a high velocity dual fuel burner for firing a vertical shaft melting furnace with gas or liquid fuels which is adapted to change from one fuel to the other during continuous operation without interrupting the melting process.

Another object of the precent invention is to provide a high velocity dual fuel burner for firing a vertical shaft melting furnace which requires less individualized control as a result of being banked with other burners and supplied from common fuel and air regulation devices.

Still another object of this invention is to provide a high velocity dual fuel burner for firing a vertical shaft melting furnace with gas or liquid fuels which is quieter than conventional nozzle mix burners.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with accompanied drawings in which like parts are given like identification numerals and wherein:

DESCRIPTION OF THE PREFERRED EMBODIMENT

Figure 1:
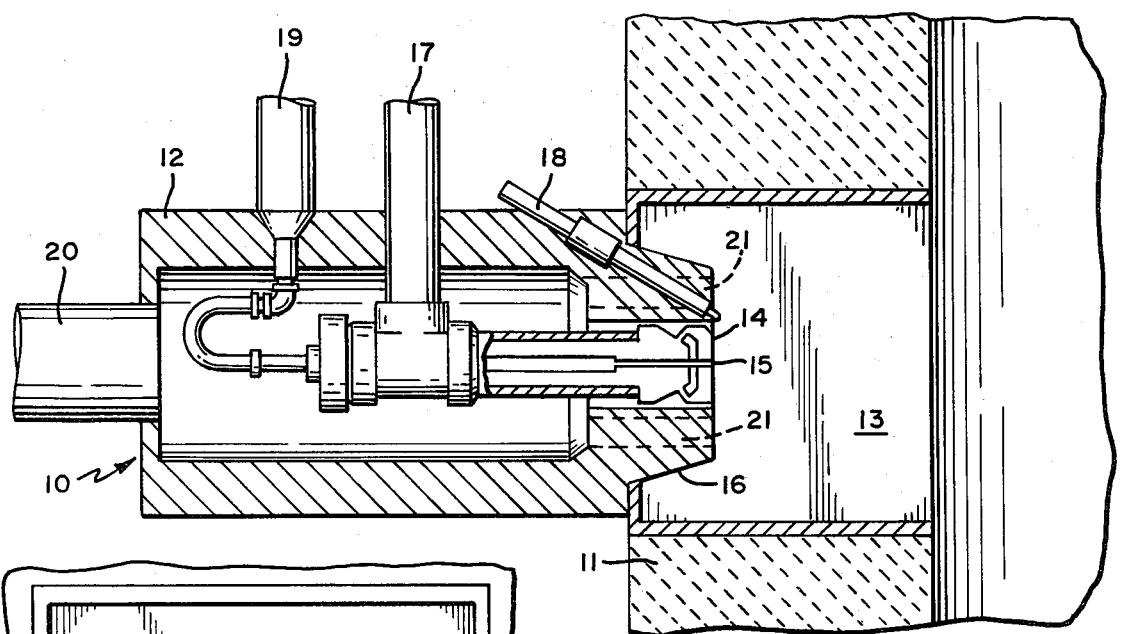
FIG. 1 is a sectional view of the preferred embodiment of the present invention as mounted on a vertical shaft melting furnace.

As FIG. 1 illustrates, the improved high velocity dual fuel burner assembly 10 is mounted in a conventional manner to the wall of a vertical shaft melting furnace 11 adapted for melting metal pieces therein. The two major components of the burner 10 are the cylindrical burner housing 12 and the combustion chamber 13. Between the cylindrical burner housing 12 and the combustion chamber 13 is a series of concentric nozzles including a pilot fuel nozzle 14 which surrounds a liquid fuel nozzle 15 and is itself surrounded by a combination combustion air and/or premixed gas and air nozzle 16.

Pilot fuel, generally premixed gas and air, is supplied to the pilot fuel nozzle 14 by pilot fuel supply pipe 17 and is initially ignited by a spark plug or similar device 18. The pilot fuel nozzle 14 includes a multiplicity of symetrically spaced ports 22 (shown in FIG. 2) which direct the pilot fuel into a generally uniform pattern within combustion chamber 13 in order to promote efficient ignition. The pilot fuel is preferably continuously supplied to the pilot fuel nozzle 14 through the main pilot supply pipe during operation to ensure constant combustion of the main fuel whether gas, liquid or a combination thereof. The pilot fuel is preferably premixed gas and air but could be any type of easily ignitable fuel.

When liquid fuel has been selected to fire the furnace 11, the liquid fuel is supplied under pressure to the liquid fuel nozzle 15 by a liquid fuel supply pipe 19. The liquid fuel nozzle 15 is the centralmost of the three generally concentric nozzles 14, 15 and 16 and is also concentric with the cylindrical combustion chamber 13 to promote uniform combustion of the liquid fuel in the combustion chamber 13. A high volume of combustion air, for use in combustion of the liquid fuel, is supplied by a combination combustion air or premixed gas and air supply pipe 20. The combustion air passes through the burner housing 12, through the combination combustion air or premixed gas and air nozzle 16 and into the combustion chamber 13 where it is mixed with the fuel.

The combination nozzle 16 is the outwardmost of the three concentric nozzles 14, 15 and 16 and compprises a multiplicity of symetrically located passageways 21 to permit high velocity and high volume flow into the combustion chamber 13.

The liquid fuel nozzle 15 is a spray type nozzle which, in combination with the high velocity pilot burner fluid stream, vaporizes a high volume of liquid fuel into the path of the combustion air where it is continuously ignited by the burning pilot fuel. Concentric alignment of the liquid fuel nozzle 15 and the combination nozzle 16 with the cylindrical combustion chamber 13 plus symetrical introduction of combustion air into the combustion chamber 13 by the passageways 21 of the combination nozzle 16 promote uniformly complete combustion of the liquid fuel. The liquid fuel is preferrably a low sulfur containing fuel since it is desirable to prevent sulfur contamination of the metal within the furnace 11.

To change from liquid fuel to gas fuel without substantial interruption of the melting process, a premixed gas and air fuel gradually and increasingly replaces the combustion air as the substance supplied to the combustion chamber 13 by the combination combustion air and premixed gas and air supply pipe 20 while the quantities of liquid fuel supplied to the liquid fuel nozzle 15 decreases to a halt. Once the conversion is complete, the premixed gas and air fuel passes through the passageways 21 of the combination nozzle 16 into the combustion chamber 13 in a substantially symetrical pattern where it is continuously ignited by the burning pilot fuel to promote uniformly complete combustion of the premixed gas and air fuel.

To convert back to liquid fuel this process is simply reversed. The conversion may be only partial if desired to allow firing the furnace 11 with liquid fuel and gas fuel at the same time.

Since the three nozzles 14, 15 and 16 are concentric with each other and with the combustion chamber 13, portions of the supply pipes 17, 19 and 20 should be concentric with the longitudinal axis of the cylindrical combustion chamber. The interior of the burner housing 12 may be an extension of the combination combustion air and premixed gas and air supply pipe 20 and is concentric with the longitudinal axis of the combustion chamber 13. Inside of and concentric with the burner housing 12 is a portion of the pilot fuel supply pipe 17 which connects to the pilot fuel nozzle 14. Inside of and concentric with that portion of the pilot fuel supply pipe 17 is the portion of the liquid fuel supply pipe 19 which leads to the liquid fuel nozzle 15.

Figure 2:
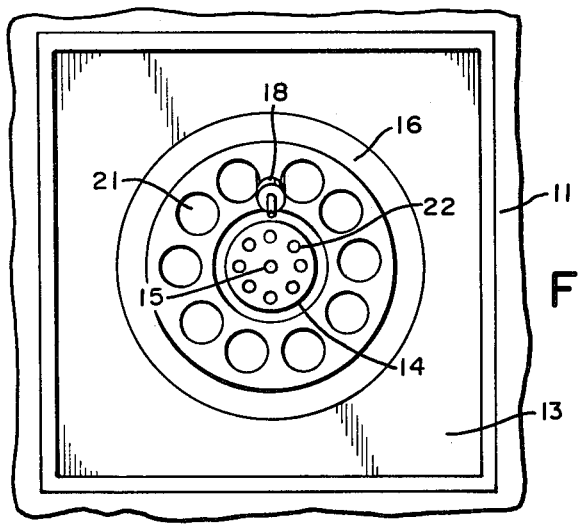
FIG. 2 is an end view of the preferred embodiment of the present invention as seen from inside a vertical shaft melting furnace.

FIG. 2 is a view of the burner 10 and the combustion chamber 13 from within the furnace 11. This view clearly illustrates the desired concentricity of the combustion chamber 13 and the three nozzles 14, 15 and 16 and the symetry of the pilot fuel nozzle ports 22 and the combination nozzle passageways 21 which combine to ensure uniformly complete combustion.

An unexpected advantage of this improved high velocity dual fuel burner 10 is that it is generally much quieter than conventional nozzle mix burners used in the prior art.

Figure 3:
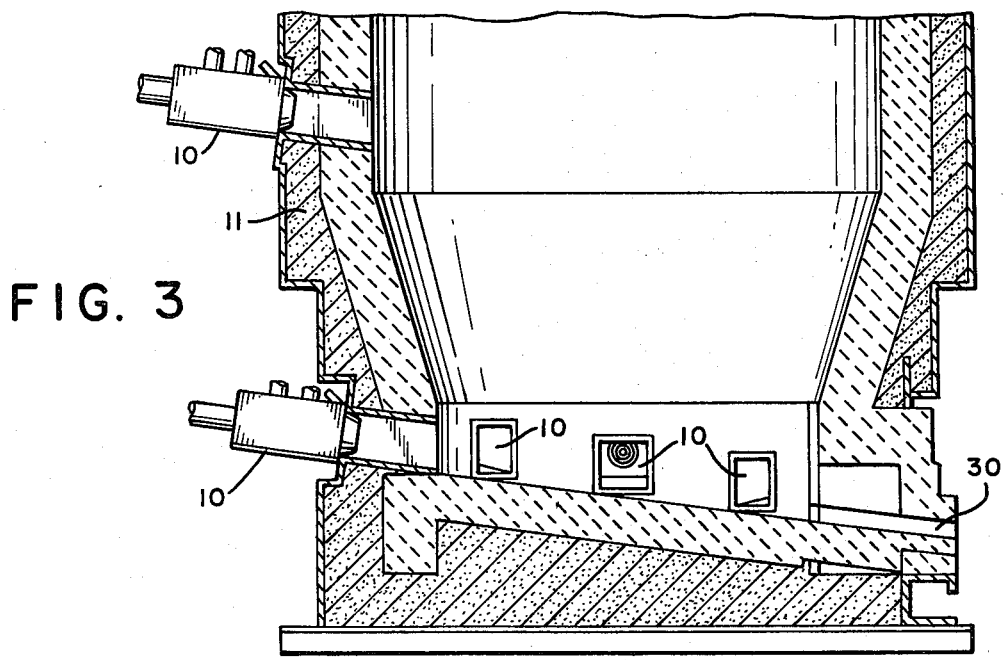
FIG. 3 is a sectional view of the lower portion of a conventional vertical shaft melting furnace adapted for use with the present invention.

FIG. 3 illustrates the lower portion of a furnace 11 adapted for use with the improved high velocity dual fuel burners 10. Metal which is to be melted in this furnace 11, copper pieces for example, is charged into the top of the furnace (not shown) and descends to the bottom of the furnace 11 as it is continuously melted by the high velocity dual fuel burners 10 and exits the furnace 11 through a tapping outlet 30 for further processing.

The burners 10 are grouped or banked in control groups comprising about three to six burners and are supplied from common fuel and air sources (not shown) to enable uniformity of the combustion process by reducing the complexity of the air and fuel mixing apparatus. Control and distribution of the fuel may be provided by a system (not shown) such as the one disclosed in U.S. Pat. No. 4,211,555.

While this invention has been described in detail with particular reference to a preferred embodiment thereof, it will be understood that the variations and modifications can be effective within the spirit and scope of the invention as described hereinbefore and as defined in the appended claims.

What is claimed is:

1. An improved method of operating a vertical shaft metal melting furnace of the type having a multiplicity of high velocity dual fuel burners located near the bottom of, and communicating with the interior of said furnace through a refractory combustion chamber, said burners adapted to be fired with a fuel selected from the group consisting of gaseous and liquid fuel and combinations thereof in order to melt pieces of copper by injecting heat resulting from combusting said fuel and air in said combustion chamber communicating with said furnace, wherein the improvement comprises the steps of;
introducing copper pieces to be melted into the top of said shaft furnace;
premixing natural gas fuel with air;
flowing a first stream of gaseous fuel to said burner;
supplying an additional amount of air, necessary to combust said gaseous fuel, to said burner;
injecting the streams of premixed gas and air and additional air in a substantially uniform pattern into said combustion chamber;
mixing, igniting, and burning said first stream of gaseous fuel and said air to supply heat to said combustion chamber then injecting said heat into said furnace;
after heating said combustion chamber, then flowing a liquid fuel oil to said burner;
increasing the flow of air to said burner to the amount necessary to combust said liquid fuel;
maintaining at least a continuous pilot flame in the combustion chamber by burning some gaseous fuel while reducing the flow of said gaseous fuel to the burner;
mixing and burning said liquid fuel and said air in the presence of said pilot flame to supply heat into said furnace;
continuously directing the hot products of combustion toward said pieces of copper to melt said copper; and
continuously discharging molten copper from the bottom of said shaft furnace without contaminating the molten copper with uncombusted liquid fuel oil.

2. The method of claim 1 further including the steps of:
supplying a second stream of gaseous fuel to the burner while decreasing the supply of liquid fuel to the burner and adjusting the flow of combustion air to the amount necessary to substantially completely combust all fuel thereby changing the selection of fuel without interruption of the continuous melting process.

* * * * *